United States Patent [19]

Kamada et al.

[11] 4,274,933

[45] Jun. 23, 1981

[54] COATING COMPOSITION

[75] Inventors: Kazumasa Kamada; Isao Sasaki; Kenji Kushi, all of Ohtake, Japan

[73] Assignee: Mitsubishi Rayon Co., Ltd., Tokyo, Japan

[21] Appl. No.: 103,626

[22] Filed: Dec. 14, 1979

[30] Foreign Application Priority Data

Dec. 28, 1978 [JP] Japan ................................ 53-164683

[51] Int. Cl.³ ................................................ C08F 2/46
[52] U.S. Cl. ........................ 204/159.24; 204/159.23; 252/600; 260/29.1 R; 264/1.1; 264/22; 351/166; 427/44; 427/164; 427/389.7; 428/412; 428/492; 428/500; 526/222; 526/227; 526/232; 526/278; 526/320; 526/329.7
[58] Field of Search ................ 430/541, 495; 252/600; 427/44, 164, 389.7; 526/320, 329.7, 364, 398, 222, 227, 232, 278; 204/159.22, 159.23, 159.24; 264/1, 22; 351/166; 428/412, 492, 500; 260/29.1 R

[56] References Cited

U.S. PATENT DOCUMENTS

| | | | |
|---|---|---|---|
| 3,840,448 | 10/1974 | Osborn et al. | 204/159.14 |
| 3,915,824 | 10/1975 | McGinniss | 204/159.23 |
| 3,968,305 | 6/1976 | Oshima | 427/54 X |
| 3,968,309 | 7/1976 | Matsuo et al. | 204/159.16 |
| 3,992,276 | 11/1976 | Powanda et al. | 204/159.16 |
| 4,012,559 | 3/1977 | Fujioka et al. | 204/159.16 |
| 4,039,722 | 8/1977 | Dickie et al. | 204/159.15 |
| 4,049,634 | 9/1977 | Ko et al. | 204/159.16 |
| 4,061,834 | 12/1977 | Haack et al. | 427/164 |
| 4,077,858 | 3/1978 | Costanza | 204/159.23 |

*Primary Examiner*—Ronald H. Smith
*Assistant Examiner*—Janyce A. Bell
*Attorney, Agent, or Firm*—Cushman, Darby & Cushman

[57] ABSTRACT

A coating composition comprising a polyfunctional monomer (a) having at least 3 (meth)acryloyloxy groups, a (meth)acrylic acid mono or diester of polyethyleneglycol (b), a sulfonic acid (c), a phosphoric acid ester (d), an ethanolamine (e), organic solvent, and a photosensitizer.

12 Claims, No Drawings

COATING COMPOSITION

BACKGROUND OF THE INVENTION

The present invention relates to a coating composition which forms a cross-linked hardened film on the substrate to which it is applied, the film exhibiting high abrasion resistance, cloud prevention properties, surface smoothness and dyeability and having a permanently high antistatic performance when irradiated, cured and cross-linked with active energy rays.

Synthetic resin moldings made of polymethyl methacrylate, polycarbonate or polyallyldiglycol carbonate have various commercial advantages in that they are not only lighter in the weight and substantially more shockproof than a corresponding glass product, but they are also cheaper in price and easier to fabricate than glass products. Accordingly, these materials have several practical applications in replacements for their glass counterparts, such as organic glass plates, light fixture covers, optical lenses, eyeglass lenses, sunglass lenses, reflectors and mirrors, diaplay panels, signboards, commercial advertizing displays, name plates, dust cover cases as well as automobile parts.

However, conventional synthetic resin moldings are particularly definient in surface abrasion resistance properties and are susceptible to damage on the surfaces, by contact with other objects, shocks and scratches during the transportation and storage or while in use. These surface scratches not only detract from the appearance of the article but also affect the properties of the article; for instance, scratches in the molded synthetic article when used as an optical surface in an optical device. Particularly, when the end uses of the coated moldings are for cameras, magnifying glasses, fashion glasses, sun glasses, correction lenses, window glass plates, decorative cases, display cases, dust covers, watch lenses, reflectors and mirrors, a surface scratch or imperfection will remarkably reduce the commercial value of the moldings and will make them unsaleable within a short period of time. Improvements in the abrasion resistance of the surface of such molded plastic articles are required.

A polyfunctional (meth)acrylate monomer has already been described as exhibiting high cross-linking hardening on polymerization when irradiated with active energy rays and is effective to improve the abrasion resistance of the surface of a synthetic resin molding and such fact has been disclosed, for example, in U.S. Pat. application Ser. No. 878,830 filed on Feb. 17, 1978, now U.S. Pat. No. 4,199,421.

While this has been an advancement in the art, there still remain problems to be resolved. For instance, the film formed on the surface of a synthetic resin molding is a cross-linked hardened film, it is difficult to diffuse the dye into the film so that the film may be dyed if so required. Also, when the film is subjected to moisture, it readily becomes clouded. Further, when friction is applied to the article, such as during cleaning, the film will generate static electrocity causing dust to be readily deposited on it. This detracts from the visual impression of the article, particularly when dust is deposited on difficult to clean surfaces such as the inside surface of a watch crystal. Accordingly, the value of the molding will be remarkably reduced, the range of end use applications is limited and cleaning or maintenance difficulties are encountered in practice.

A proposal has been made for improving the dyeability and cloud prevention properties of a coating which is a method in which either a compound having several dyeing coupling agents or cites, or a hydrophilic compound is mixed in a coating material composition. However, when such compound is included in the coating composition, the abrasion resistance will be reduced. As for preventing the generation of static electricity, there are procedures known in which an antistatic agent is mixed with the coating or a method in which a monomer itself having antistaticity properties is copolymerized with the coating monomer. The addition of an antistatic-type material is a convenient production method but only the antistatic agent present on the surface of the coating will develop the desired effect. Thus, in order to obtain sufficient preventing properties on the one hand, a high concentration of the antistatic agent is required, while on the other hand the abrasion resistance and appearance of the article will be reduced. Further, as the antistatic agent present on the surface will be easily dissipated by washing the surface or with friction and the coating will depreciate in its static properties. If the antistatic agent is present in the coating matrix, it may gradually seep out, however, this seepage tends to make the surface sticky and translucent, i.e., no longer optically transparent. Further, any durability against washing or the like is only temporary and is not permanent. With respect to the copolymerizing type of antistatic agent, no monomer other than in the surface layer will develop the effect, therefore a large amount of the monomer must be added and mixed and as a result the abrasion resistance and appearance will be reduced accordingly.

SUMMARY OF THE INVENTION

As a result of additional research, we have discovered that the above deficiencies, particularly as regards antistatic properties can be immediately resolved by including in the coating composition various specific compounds. Accordingly, the present invention in its composition aspect provides a coating that upon irradiation hardens to form a permanently antistatic type coating on the plastics or other substrate to which it is applied, the coating composition comprising:

A. from about 5 to about 90 parts by weight of a monomer mixture consisting of:
   (1) from about 20 to about 95% by weight of a polyfunctional monomer having at least three (meth)acryloyloxy groups per molecule;
   (2) from about 1 to about 25% by weight of a monomer represented by the following general formula:

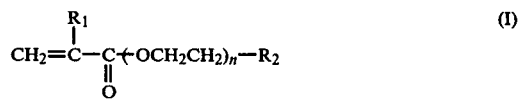

in which $R_1$ is hydrogen or a methyl group, $R_2$ is an alkoxy or (meth)acryloyloxy groups of 1 to 5 carbon atoms and n is an integer of 5 to 30;
   (3) from about 1 to about 15% by weight of a sulfonic acid type monomer represented by the following general formula:

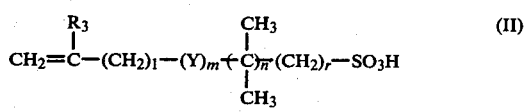

(II)

in which $R_3$ is hydrogen or a methyl group, Y is a —CONH or a —COO group and l, m, n' and r are integers of 0 to 5;

(4) from about 1 to about 20% by weight of a phosphoric acid ester-type monomer represented by the following general formula:

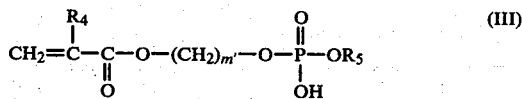

(III)

wherein $R_4$ is hydrogen or methyl group, $R_5$ is hydrogen or a

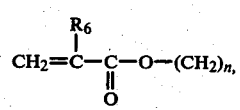

group, $R_6$ is hydrogen or a methyl group and m' and n'' are integers of 1 to 15; and (5) from about 2 to about 20% by weight of an ethanolamine type compound represented by the following general formula:

$$NR_7R_8(CH_2CH_2OH) \qquad (IV)$$

where each of $R_7$ and $R_8$ is hydrogen or an alkyl group of 1 to 15 carbon atoms or a $CH_2CH_2OH$ group;

B. from about 95 to about 10 parts by weight of at least one organic solvent that forms a uniform solution when mixed with monomer mixture A; and C. up to 10 parts by weight of a photosensitizing agent calculated on the basis of 100 parts by weight of the total of the monomer mixture A and the organic solvent B, the coating composition being characterized as being able to form a cross-linked hardened film high in abrasion resistance, surface smoothness, cloud prevention and dyeability while having permanent antistaticity properties when irradiated with active energy rays.

DESCRIPTION OF THE PREFERRED EMBODIMENTS

Having generally described the primary components of the coating composition above, a detailed description of each of the components thereof will now be given it being understood that certain of the ingredients are optional, however, when included in the composition they are present to the extent of at least 0.1% by weight of the monomer mixture A.

The polyfunctional monomer (1) having at least three (meth)acryloyloxy groups in one molecule used in the present invention is a cross-linkable monomer obtained by the reaction of a trihydric or higher polyhydric alcohol, or its derivative, with (meth)acrylic acid, or a halide or an ester of (meth)acrylic acid. Specific examples of the polyhydric alcohol are trimethylolpropane, pentaglycerol, glycerine, diglycerine, pentaerythritol and dipentaerythritol. This polyfunctional monomer is the main component which forms a cross-linked hardened film when irradiated with active energy rays, however, when using certain polyfunctional monomers when irradiated in air, the cross-linking hardening reaction will be inhibited by the oxygen in air and insufficient abrasion resistance in the coating will result. If this occurs, it is necessary to irradiate the coating in an inert atmosphere such as nitrogen or carbon dioxide gases. As a practical matter, however, the use of an inert atmosphere is an unnecessary complication in the manufacturing process, thus it is preferable, when carrying out the process of the present invention, to use a monomer which can form a cross-linked hardened film with sufficient abrasion resistance when irradiated in air.

The specific class of polyfunctional monomers satisfying these and other requirements are the polypentaerythritol poly(meth)acrylate monomers represented by the following general formula:

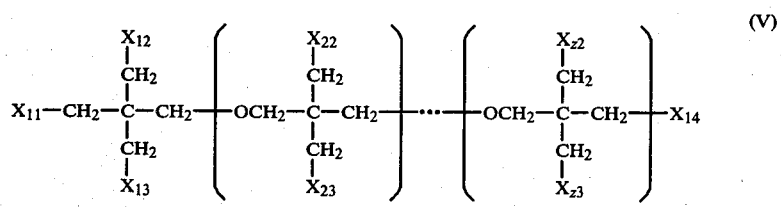

(V)

in which at least 3 of the $X_{11}$, $X_{12}$, $X_{13}$, $X_{22}$, $X_{23}$—$X_{z2}$, $X_{z3}$ and $X_{14}$ substituents are $CH_2$=$CR$—COO-groups and the rest are —OH groups, z is an integer of 1 to 5 and R stands for hydrogen or a methyl group. Such monomers exhibit very high polymerizing activity when irradiated with active energy rays and form a cross-linked, hardened polymer film showing high abrasion resistance. In compositions of the present invention, by using the polyfunctional monomer represented by the above mentioned general formula (V), the object is readily attained. We have found that in particular pentaerythritol tri(meth)acrylate, pentaerythritol tetra(meth)acrylate, dipentaerythritol tetra(meth)acrylate, dipentaerythritol penta(meth)acrylate and dipentaerythritol hexa(meth)acrylate are preferable monomers in respect of the polymerizing activity when irradiated with active energy rays in air. A single monomer or mixtures of two or more of the polyfunctional monomer represented by the above formula (V) may be used in the compositions.

The amount of the polyfunctional monomer (1) contained in the compositions of the present invention is from about 20 to as much as about 95% by weight, or preferably 40 to 90% by weight, of the monomer mixture A. We have found in instances where the amount of the polyfunctional monomer (1) is less than 20% by weight in the monomer mixture A, no hardened film having a sufficient abrasion resistance is obtained. On the other hand, if the amount exceeds 95% by weight, the smoothness of the film is substantially reduced.

The viscosity of the polyfunctional monomer (1) having at least 3 (meth)acryloyloxy groups per molecule to be used in the coating compositions of the present invention is generally fairly high and thus will have a disadvantageous influence on the surface smoothness and control of film thickness of the cross-linked hardened film in some instances. If this occurs suitable adjustment may be made by adding a low viscosity monomer (6) having not more than 2 (meth)acryloyloxy groups per molecule which monomer is used together with the polyfunctional monomer (1). As specific examples of this monomer (6), the following may be mentioned: Neopentyglycol di(meth)acrylate, ethyleneglycol di(meth)acrylate, diethyleneglycol di(meth)acrylate, triethyleneglycol di(meth)acrylate, tetraethyleneglycol di(meth)acrylate, 1,3-butylene di(meth)acrylate, 1,4-butanediol di(meth)acrylate, 1,6-hexanediol di(meth)acrylate, 1,3-propyleneglycol di(meth)acrylate, butyl(meth)acrylate, isobutyl(meth)acrylate, t-butyl(meth)acrylate, 2-ethylhexyl(meth)acrylate, lauryl(meth)acrylate, tridecyl(meth)acrylate, cyclohexyl(meth)acrylate, 2-hydroxyethyl(meth)acrylate, 2-hydroxypropyl(meth)acrylate, glycidyl(meth)acrylate, tetrahydrofurfuryl(meth)acrylate, benzyl(meth)acrylate, 1,4-butyleneglycol mono(meth)acrylate, ethoxyethyl(meth)acrylate, ethylcarbitol(meth)acrylate, 2-hydroxy-3-chloropropyl(meth)acrylate and dipropyleneglycol di(meth)acrylate. Among this class of monomers, in the case of the present invention, there are monomers having a hydroxyl group and/or cyclic ether bond and/or chain ether bond in the side chain or between two (meth)acryloyloxy groups, such as diethyleneglycol di(meth)acrylate, triethyleneglycol di(meth)acrylate, tetraethyleneglycol dimethacrylate, 2-hydroxyethyl(meth)acrylate, 2-hydroxypropyl (meth)acrylate, glycidyl (meth)acrylate, tetrahydrofurfuryl (meth)acrylate, ethoxyethyl (meth)acrylate, ethylcarbitol (meth)acrylate, butoxyethyl (meth)acrylate, 1,4-butyleneglycol mono(meth)acrylate and dipropyleneglycol di(meth)acrylate are so high in polymerizing activity in air and as such are particularly preferable. Further, the material used as the monomer of formula (V) preferably has a boiling point not less than 150° C. under the normal atmospheric pressure and a viscosity not greater than 20 centipoises at 20° C. Two or more monomers of this type may be mixed together. The amount of the monomer (6) added to the coating composition is not more than about 30% by weight of monomer mixture A and when the amount added exceeds 30% by weight, the abrasion resistance of the resulting hardened film will be unacceptably reduced. Further, in accordance with the compositions of the present invention, the monomer (2) of the formula (I) used in the present invention is polyethyleneglycol (meth)acrylic acid mono- or diester in which the ring opening polymerization degree n of ethylene oxide is from 5 to 30. This compound is essential to impart cloud prevention properties to the compositions of the present invention and are also used to emphasize the improved dyeability and permanent antistaticity properties. Here, when n is 4 or less, the effect of imparting cloud preventing properties and the synergistic effect of improving the dyeability and antistaticity is not obtained while on the other hand when n exceeds 30 the hardness is unacceptably reduced. The amount of the monomer (2) included in the mixture A is preferably from about 1 to about 25% by weight of the monomer mixture A, and when the amount is less than 1% by weight insufficient cloud prevention is obtained. When the amount exceeds 25% by weight, the hardness and abrasion resistance will be reduced.

The sulfonic acid type monomer (3) of the formula (II) to be used in the present invention is a sulfoalkyl ester of an unsaturated monocarboxylic acid having a double bond, or the acid amide thereof. Specific examples are sulfoethyl acrylate, sulfoethyl methacrylate, sulfopropyl acrylate, sulfopropyl methacrylate, sulfobutyl acrylate, sulfobutyl methacrylate, sulfoethylvinyl acetate, sulfopropylvinyl acetate, sulfopropylvinyl propionate, 2-acrylamide-2-methylpropane sulfonic acid, 2-methacrylamide-2-methylpropane sulfonic acid and 3-acrylamide-3-methylbutane sulfonic acid.

While it is generally known that a compound with an $SO_3H$ group is effective to impart a hydrophilicity and dyeability, care must be taken that the compound not be too high in hydrophilicity so as to be substantially insoluble in the organic solvent. Therefore, when the compound is included in the reaction system in which it is used and mixed with an organic solvent, as in the case of the present invention, it will cause a phase separation and will not be uniform. Therefore, it has been difficult to use in practice. This is the same even in the case of systems using no organic solvent. While it is substantially incompatible with an organic solvent, it is soluble in a specific hydrophilic organic solvent, but its solubility is so low that only a slight amount of the monomer can be mixed and the desired effect is not obtained.

Up to the present, the use of a compound containing an $SO_3H$ group has been limited to a system using water as the solvent or to a special organic solvent such as N,N'-dimethylformamide or dimethyl sulfoxide. However, when such a solvent system is applied to a plastic substrate the plastic will not be thoroughly wetted and will tend to repel the solvent system thus making it difficult to form a uniform coating film.

In contrast to these experiences, we have found that when the sulfonic acid-type monomer represented by the above general formula (II) is used together with a specific ethanolamine-type compound, the solubility in the organic solvent will be greatly improved, a uniform, fully acceptable hardened film will be formed on the surface of the article and a substantial improvement in the dyeability and antistaticity of the coating will be observed. With a sulfonic acid-type compound having a structure other than as represented by the above formula (II), the desired results of the present invention will not be obtained. Using a compound in which Y is, for example, a phenyl or phenol group in the formula (II), even when used together with the ethanolamine-type compound of formula (V), the solubility will not be noted to substantially improve. Alkaline earth metal salts such as Na or K of the sulfonic acid-type compounds of formula (II) must be used by noting that it is so high in hydrophilicity that the effect of improving the solubility is low.

The amount of the sulfonic acid-type monomer (3) of formula (II) present in the monomer mixture is from about 1 to about 15% by weight, and preferably between about 5 and about 10% by weight of the monomer mixture A. When present in an amount less than 1% by weight, the dyeability and antistaticity properties are not improved and when the amount exceeds 15% by weight the transparency and abrasion resistance are reduced.

The most significant features of the effect of the present invention that are obtained by using the sulfonic acid-type monomers (3) of formula (II) are first that the dyeability and antistaticity are improved without concurrently reducing the abrasion resistance and appearance of the coating, and second that a permanent antistaticity is imparted to the article, which will not be reduced by washing or wiping. We have found that these specific effects are very peculiar to the present invention and are obtained by the simultaneous use of the sulfonic acid-type monomer of formula (II) and the ethanolamine-type compound of formula (IV). This particular combination substantially elevates the value of articles coated with the coating composition of the present invention. For example, with 2-acrylamide-2-methylpropane sulfonic acid (AMPS), even if diacetone acrylamide is used in which the $SO_3H$ group of AMPS is converted to a $COCH_3$ group the dyeability will be improved to some extent but the hardness of the coating will greatly reduce while no effect on the antistaticity will be perceived at all. Further, the vinylbenzene sulfonic acid has a vinyl group and $SO_3H$ group the same as AMPS and improves the dyeability and antistaticity to some extent, but is overall low in solubility so that it is limited in the amount of its use. Even if a slightest amount of it is added, the resulting hardened film will be clouded and is greatly reduced in hardness. Any slightly improved antistaticity property is not permanent as it simply vanishes with water washing.

The phosphoric acid ester-type monomer (4) for inclusion in the monomer mixture of the present invention has at least one (meth)acryloyloxy group as shown by formula (III). Specific examples of such monomers include (meth)acryloxyethyl phosphate, di(meth)acryloxyethyl phosphate, (meth)acryloxypropyl phosphate and (meth)acryloxybutyl phosphate. By contrast, another halogenated vinyl phosphate or alkyl-substituted vinyl phosphate not having a (meth)acryloyloxy group inhibits the air hardenability of the film shows no effect of improving the prevention of cloudiness in the hardened film.

Again, it is to be emphasized that particular combinations of specific monomer types are used to obtain the desired results. When the phosphoric acid ester-type monomer (4) is used as mixed together with the polyethyleneglycol (meth)acrylate represented by formula (I) and the ethanolamine-type compound represented by formula (IV), the function of the hardened film will be improved, perhaps the most noticeable is imparting to the film a cloud preventing characteristic. The phosphoric acid ester-type monomer is effective to improve the dyeability and antistaticity as well, although it is noted that even if the phosphoric acid ester-type monomer is not included in the compositions dyeability and antistaticity properties are significantly improved by the sulfonic acid-type monomers of formula (II) alone. As to the cloud prevention, however, the sulfonic acid-type monomers of formula (II) are not effective and the addition of the phosphoric acid ester-type monomer of formula (III) to the coating compositions of the present invention is an essential requirement to attain the desired results. When it is used together with the polyethyleneglycol (meth)acrylate of formula (I) and the ethanolamine type compound of the formula (IV), surprising results are achieved.

The amount of phosphoric acid ester-type monomer included in the coating compositions of the invention is about 1 to about 20% by weight in monomer mixture A.

When the amount is less than 1% by weight the effect of improving t. e cloud prevention is small while in case it exceeds 20% by weight, the transparency and abrasion resistance are reduced.

The ethanolamine-type compound to be used in the present invention is an alkylamine having at least one —$CH_2CH_2OH$ group per molecule as shown in formula (IV) and is a component essential to improve the solubility of the sulfonic acid-type monomer. An alkylamine devoid of $CH_2CH_2OH$ groups is low in the solubilizing effect. Preferably, the N-substituted alkyl group has from 1 to 15 carbon atoms for if it exceeds 15 carbon atoms the hardness will be reduced. Specific examples of useful ethanolamine-type compounds that are useful include ethanolamine itself, as well as beta-ethylhexylethanolamine, diethanolamine, N-butyldiethanolamine, N-hexyldiethanolamine, N-lauryldiethanolamine, N-cetyldiethanolamine and triethanolamine. The amount of the ethanolamine compound used is from 1 to 20% by weight, and preferably from 5 to 15% by weight of the monomer mixture. When it is less than 1% by weight the solubility of the sulfonic acid-type monomer does not improve while when the amount exceeds 20% by weight the transparency and hardness of the cross-linked film will be reduced.

The mixing ratio of the sulfonic acid-type monomer (3) to the ethanolamine-type compound (5) is not necessarily limited to a specific ratio for reasons of operability, but we prefer that the ratio of the weight of monomer (3) to monomer (5) be in the range of 0.3:1 to 3:1.

The organic solvent component B of the coating composition of the present invention is used to impart the required and desirable painting workability and uniform coating film formation properties when the coating composition is applied to the surface of a synthetic resin molding, to improve storage stability and to increase the adhesion of the cross-linked hardened film to the base material to which it is applied.

The organic solvent or mixture of solvents used in the coating compositions of the present invention must satisfy at least the following conditions:

(1) The organic solvent should form a uniform, complete solution when mixed with the polyfunctional (meth)acrylate monomer mixture A;

(2) The boiling point of the organic solvent under normal or atmospheric pressure should be from about 50° to about 200° C.;

(3) The viscosity at room temperature of 20° C. should not be higher than 10 centipoises; and (4) The amount of organic solvent or mixture of solvents should be at the rate of 95 to 10 parts by weight per 5 to 90 parts by weight of the polyfunctional (meth)acrylate mixture A, the total of monomer mixture A and solvent B being 100 parts by weight.

It is the first requirement for the organic solvent to form a uniform solution with the polyfunctional (meth)acrylate monomer mixture A. Care must be taken in the selection of an appropriate solvent system in order to provide a film coating of the required properties. Saturated hydrocarbon-type organic solvents such as, for example, n-hexane, n-heptane or cyclohexane do not form a uniform solution. The second requirement is that the boiling point under the normal or atmospheric pressure should be in the range of about 50° to about 200° C. This value is important is provide a uniform film if the surface of the synthetic resin molding is to be painted in order to form a cross-linked hardened film having a totally smooth surface. If the boiling point of the solvent or solvent system under the normal pressure is below 50° C., after the coating composition is applied the base material surface will be cooled by the latent heat of the organic solvent evaporating from the coating film, the moisture in the surrounding air will condense and the surface smoothness of the coating film will be lost. By contrast, if the boiling point of the organic solvent exceeds 200° C. the volatilization of the organic solvent from the coating film will be so slow that there will be difficulty in the workability. Further, when irradiated with active energy rays the evaporation and escape of the remaining organic solvent and the formation of the cross-linked hardened film caused by the polymerization will not be balanced with each other, thus the uniformity and surface smoothness of the cross-linked hardened film will be lost or the organic solvent will remain in the cross-linked hardened film to whiten the film. For these reasons, it is necessary therefore that the boiling point of the organic solvent should be 50° to 200° C. and preferably from about 60° to about 150° C. under atmospheric pressure.

It is also necessary that the viscosity of the organic solvent incorporated in the coating composition should not be higher than 10 centipoises for when it exceeds 10 centipoises, the viscosity of the coating material composition will become so high that the paintability and cross-linked hardened film performance are substantially reduced.

The amount of the organic solvent used is preferably about 95 to about 10 parts by weight per 5 to 90 parts by weight of the above described monomer A, the total of A plus B being 100 parts by weight. The correct ratio between the organic solvent and the monomer mixture depends upon several factors including the nature of the monomers, their interaction with each other, the viscosity of the coating composition as well as the nature of the substrate to which the coating is applied. Following the teachings herein and possibly with only minor experimentation the skilled operator will select the proper monomer/solvent properties. If the amount added is less than 10 parts by weight the viscosity of the coating material composition will be so high that the composition's ability to properly coat or paint on a surface will be low, the thickness of the coating film will be difficult to control, a non-uniform film formation is likely to occur and even the adhesion of the cross-linked hardened film to the base material will be reduced under severe conditions. On the other end of the scale if the organic solvent content exceeds 95 parts by weight the thickness of the cross-linked hardened film will be difficult to control, the surface smoothness will be lost and abrasion resistance will be reduced.

Depending on the article on which the cross-linked hardened film is to be formed, the surface smoothness of the cross-linked hardened film may be required to be very high or the flexibility and thinness of the film may be required. Therefore, it is very important in practice to adjust the viscosity of the coating composition to maximize the painting workability and the uniformity of the film coating and to make it easy to control the film thickness. In order to accomplish this, the viscosity of the coating composition is conveniently controlled by adjusting the mixing rates of the respective component monomers in the monomer mixture and the amount of use of the organic solvent incorporated therein as well as to select the appropriate method of forming the film according to the purpose for which the coating is applied.

The organic solvent used in the coating compositions must satisfy the above described conditions. Specific examples include alcohols such as ethanol, isopropanol, normal propanol, isobutylalcohol and normal butylalcohol; aromatic hydrocarbons such as benzene, toluene, xylene and ethylbenzene; ketones such as acetone and methylethylketone; ethers such as dioxane; acid esters such as ethyl acetate, n-butyl acetate and ethyl propionate and N,N'-dimethylformamide. Any one of these organic solvents may be used alone or two or more of them may be used in mixture provided that the boiling point and component rates of the mixture fall within the above requirements.

One may also use as solvent a polymerizable monomer which is itself solvent, such as methyl acrylate, ethyl acrylate, methyl methacrylate or styrene as an organic solvent if, for example, the momomer-solvent has a specific object for its inclusion, satisfies the same conditions as other organic solvents and has the same results.

Depending on the particular type of synthetic resin used as the base material, the organic solvent present in the coating composition may cloud the resin used as the substrate, causing it to change from transparent to translucent. Also a given solvent or solvent system may dissolve the dyeing pigment out of a colored base material and discolor the resin or may cause the synthetic resin substrate to crack. Thereafter, it is preferred that the organic solvent system be properly selected and used in response to the type of base material on which the cross-linked hardened film is to be formed or as to the purpose or object of the coating procedure. The skilled operator will be able to quickly determine the suitability of a given solvent system based upon a few trial and error experiments.

In order to apply the coating composition of the present invention to the surface of a synthetic resin molding to form a cross-linked hardened film thereon, it is necessary to irradiate the applied composition with active energy rays such as ultraviolet rays, electron rays or radioactive rays. We prefer irradiation with ultraviolet rays as for most situations it is the most convenient in practice.

When using ultraviolet rays as the cross-linking energy rays for hardening the coated film, it is necessary to add into the coating composition a photosensitizing agent C which can initiate a polymerization reaction upon contact with the ultraviolet ray irradiation. Specific examples of suitable photosensitizing agents include the carbonyl compounds such as benzoin, benzoin methylether, benzoin ethylether, benzoin isopropylether, acetoin, butyloin, toluoin, benzil benzophenone, p-chlorobenzophenone and p-methoxybenzophenone; sulfur compounds such as tetramethylthiulum monosulfide and tetramethylthiulum disulfide; azo compounds such as azobisisobutylonitrile and azobis-2,4-dimethylvaleronitrile; and peroxide compounds such as benzoyl peroxide and ditertiary butyl peroxide. Any one of these or similar photosensitizing agents may be used alone or two or more of them may be used in combination.

The amount of photosensitizing agent or agents included in the coating composition is up to 10 parts by weight, and preferably from at least 0.01 up to about 10 parts by weight per 100 parts by weight calculated on the basis of the total of monomer mixture A and organic solvent B. When the amount of photosensitizing agent added is too large the cross-linked hardened film formed will be colored and its ability to withstand weather, particularly sunlight, will be reduced.

It will be understood that other additives, dyes, pigments, processing agents, storage stabilizers and the like to name just a few, may be added to the coating compositions without adversely influencing the desirable properties obtained by our invention and without departing from the scope and spirit of our contribution. Additives such as a surface active agent, an ultraviolet ray absorbing agent or storage stabilizing agent can be properly added, as required, to the coating compositions of the present invention in accordance with experience and contemporary practice.

The method of using the above coating compositions will now be described, thus a synthetic resin molding that is high in the abrasion resistance, cloud prevention, surface smoothness, dyeability and antistaticity is made by applying the above described coating composition to the surface of the synthetic resin molding and then irradiating the coated article with active energy rays to cross-link and cure the film and adhere it to the substrate.

There are a number of highly suitable articles onto which the coating compositions of the present invention are particularly attractive. Some specific examples of the base material substrates of synthetic resin molding materials used to make resin moldings having the above desired characteristics are various thermoplastic and thermosetting synthetic resin moldings such as sheet-shaped moldings such as glass plates and mirrors, injection moldings such as light fixtures and lenses, film-shaped moldings and rod-shaped moldings made of all types of synthetic plastics-type resins, most notably polymethyl methacrylate, polycarbonate, polyallyldiglycol carbonate, polystyrene, acrylonitrile-styrene copolymer (AS resins), polyvinyl chloride, acetate, ABS resins and polyester. Among these moldings, the moldings made of polymethyl methacrylate, polycarbonate and polyallyldiglycol carbonate are especially preferred primarily for their excellent optical properties as well as their heat and shock resistance.

The synthetic molded articles as described above are convenient substrates to which the above-described coating compositions are applied. Also, these articles may be pretreated with etching, corona discharge, active energy ray irradiation, dyeing or printing. Any convenient method of applying the coating compositions may be applied, including brush painting, flow painting, spray painting, rotation painting or dip painting to coat the synthetic resin molding article with the above described coating compositions.

Though different, depending on the amount of and use of the monomer mixture A contained in the coating composition, the amount of the coating composition applied to the surface of the synthetic resin molding is such that the thickness of the cross-linked hardened film formed on the surface of the synthetic resin molding is preferably in the range of about 1 to about 30 microns. The amount of the coating composition required to provide such a coating is sufficient to provide an undried or wet film of a thickness in the range of about 15 to 300 microns.

If the thickness of the cross-linked hardened film formed on the surface of the synthetic resin molding is less than 1 micron the abrasion resistance of the coating will be reduced and when it exceeds 30 microns the hardened film has reduced flexibility, and is likely to crack and therefore the molding itself will be reduced in the strength.

In order to cross-link and harden the applied wet coating composition film, it must be irradiated with active energy rays such as ultraviolet rays that are emitted from various light sources as a xenon lamp, a low voltage mercury lamp, a high voltage mercury lamp or an ultrahigh voltage mercury lamp, or the electron rays taken usually out of an electron ray accelerator of 20 to 200 K.V. or radioactive rays such as alpha, beta or gamma rays. For convenience of operation, in practice the ultraviolet rays are preferred as the irradiating rays.

An inert gas atmosphere, such as nitrogen or carbon dioxide, is preferable as an atmosphere in which the coating composition is irradiated with the active energy rays of the type described. However, when the solution contains the polyfunctional pentaerythritol poly(meth)acrylate monomer or monomers as described in formula (V), above, the coating composition may be irradiated in air.

The cross-linked hardened film resulting in the coating composition of the present invention and the synthetic resin molding having on its surface such a hardened film are high in the desired properties of abrasion resistance, cloud prevention, permanent antistaticity, surface smoothness and attractive appearance. In addition, while the film formed on the surface of the article is a cross-linked hardened film, is easy to dye and is particularly adapted to be dyed with a basic dye having an amine salt or quaternary ammonium base or a nitro, azo, anthraquinone or aminoketone-type of dispersed dye. With a dispersed dye a cation, anion, nonion or amphoteric ion-type surface active agent is preferably used as a dispersing agent and a chlorobenzene, methylnaphthalene, o-phenylphenol, aromatic ether or alkyl salicylate type compound is used as a carrier. The cross-linked hardened film of the present invention is also high in its ability to adhere to the base material and is particularly useful for applications such as for organic glass plates, lighting fixture covers, mirrors, eyeglass lenses and optical lenses.

EXAMPLES OF THE INVENTION

The present invention will now be more fully illustrated with reference to the following examples in which the measurements, observations and evaluations were made by the following methods and procedures:

(1) Abrasion Resistance (a) Surface hardness—pencil hardness according to JIS K5651-1966.

(b) Rubbing test—rubbing test with #000 steel wool.
o=when lightly rubbed, the surface was not substantially scratched.
Δ=when lightly rubbed, the surface was somewhat scratched.
x=even when lightly rubbed, the surface was severaly scratched to the same degree as if the coating were not applied, i.e., scratched as much as the base resin.

(2) Adhesion

A cross-cut cellophane tape peeling test was used to test the cross-linked hardened film. According to this procedure 11 film cutting lines extending from the film surface to the base material were made at intervals of 1 mm. in both the longitudinal and lateral directions on the film. This resulted in 100 mesh squares. A strip of cellophane tape was secured to the mesh squares, then was quickly peeled off. In this operation the cellophane tape was applied 3 times in the same place.

o = when repeated 3 times, no mesh of the cross-linked hardened film was peeled off.
Δ = when repeated 3 times, 1 to 50 mesh squares were peeled off.
x = when repeated 3 times, 51 to 100 mesh squares were peeled off.

(3) Surface Smoothness Measurement o = the smoothness of the surface of the film was so high as to be considered a mirror surface.
Δ = the surface smoothness of the film was high, but was delicately disordered and could not be considered to be of a mirror-like surface.
x = the surface was disordered and was hardly smooth.

(4) Antistaticity (a) Cigarette ash deposition test:

o = after the surface of the hardened film was rubbed 20 times with a cotton cloth then brought within about 1 cm. of a fresh cigarette ash, no ash was deposited.
Δ = using the same procedures as above some ash was deposited.
x = using the same procedure as above a substantial amount of ash was deposited.

(b) Measuring the period of the half reduction of staticity: After the same was maintained at a constant temperature of 20° C. under a constant relative humidity of 60% for 24 hours, the period of the half reduction of a staticity was measured using an Honest Meter manufactured by Shishido Shokai Co. with an impressed voltage of 10 K.V. for 10 seconds.

(5) Cloud Prevention of Cloudiness o = when the breath was blown onto the sample for 10 seconds which was maintained for 24 hours at a temperature of 20° C. at a relative humidity of 60%, the surface was not clouded at all.
Δ = using the same operation as above, the surface was slightly clouded.
x = using the same operation as above, the surface was substantially clouded.

In the following Examples those according to the present invention are indicated by numbers while Comparative Examples not according to the invention are designated by letters.

EXAMPLES 1–3 AND COMPARATIVE EXAMPLES A–D

A series of coating solutions having the composition as given in Table 1 were prepared and a methacrylic resin plate (available under the trademark Acrylite produced by Mitsubishi Rayon Company, Ltd.) having a thickness of 2 mm. was dipped in each of the solutions and removed from the solution at a speed of 0.5 cm./sec. to form a film. After being allowed to stand for 10 minutes the plate was irradiated for 15 seconds with ultraviolet rays of a high voltage mercury lamp (2 K.W. HO-LZI manufactured by Iwasaki Electric Co.) from a distance of 20 cm. on each surface of the plate in the atmosphere indicated in Table 1. The results of the performances and evaluations are given in Table 1.

TABLE 1

| | Composition of Coating Solution *1 (in parts by weight) | | | | | | | | Organic Solvent (B) | | | Photo-sensitizer (C) |
|---|---|---|---|---|---|---|---|---|---|---|---|---|
| Experiment No. | Monomer Mixture (A) | | | | | | | | N,N-dimethyl formamide | Isopropanol | Toluene | |
| | TMPTA | 2P5A | 9G | 23G | THF-A | AMPS | REA | MEP | | | | |
| A (Control) | 19.7 | 0 | 0 | 0 | 6.6 | 2.6 | 2.6 | 2.6 | 6.6 | 46.1 | 13.2 | 1.5 |
| B (Control) | 19.7 | 0 | 0 | 0 | 6.6 | 2.6 | 2.6 | 2.6 | 6.6 | 46.1 | 13.2 | 1.5 |
| C (Control) | 0 | 21.1 | 0 | 0 | 0 | 2.8 | 2.8 | 2.8 | 7.0 | 49.3 | 14.2 | 1.5 |
| D (Control) | 0 | 19.7 | 0 | 0 | 6.6 | 2.6 | 2.6 | 2.6 | 6.6 | 46.1 | 13.2 | 1.5 |
| Example 1 | 0 | 19.7 | 6.6 | 0 | 0 | 2.6 | 2.6 | 2.6 | 6.6 | 46.1 | 13.2 | 1.5 |
| Example 2 | 0 | 19.7 | 0 | 3.3 | 3.3 | 2.6 | 2.6 | 2.6 | 6.6 | 46.1 | 13.2 | 1.5 |
| Example 3 | 0 | 19.1 | 0 | 6.4 | 3.2 | 2.5 | 2.5 | 2.5 | 6.4 | 44.6 | 12.8 | 1.5 |

| | Evaluation results | | | | | | | | |
|---|---|---|---|---|---|---|---|---|---|
| | | | | | Abrasion Resistance | | Antistaticity | | |
| Experiment No. | Atmosphere | Film Thickness (μ) | Smoothness | Cloud prevention | Pensil Hardness | Steel Wool | Cigarette Ash | Half-Reduction Period (Sec) | Dyeability *2 |
| A (Control) | Nitrogen | 3.5 | o | x | 7H | o | o | 0.5 | Dyed, deeply, uniformly |
| B (Control) | Air | Not Hardened | — | x | — | — | — | — | — |
| C (Control) | Air | 3.5 | Δ | x | 7H | o | o | 0.6 | Dyed, deeply, uniformly |
| D (Control) | Air | 3.4 | o | x | 7H | o | o | 0.5 | Dyed, deeply, uniformly |
| Example 1 | Air | 3.1 | o | o | 7H | o | o | 0.3 | Dyed, deeply, uniformly |
| Example 2 | Air | 3.3 | o | o | 7H | o | o | 0.4 | Dyed, deeply, uniformly |
| Example 3 | Air | 3.2 | o | o | 6H | o | o | 0.3 | Dyed, deeply, |

TABLE 1-continued uniformly

*1 TMPTA = trimethylolpropane triacrylate
2P5A = dipentaerythritol pentacrylate
9G = polyethyleneglycol dimethacrylate (n = 9)
23G = polyethyleneglycol dimethacrylate (n = 23)
THF-A = tetrahydrofurfuryl acrylate
AMPS = 2-acrylamide-2-methylpropane sulfonic acid
REA = N-lauryldiethanolamine
MEP = methacryloxyethyl phosphate
BEE = benzoin ethylether
*2 Dyeing Method:
Deolene Blue 5G (produced by Ciba Geigy Co., a basic dye) 5 parts by weight
sodium acetate 0.5 part by weight
acetic acid 0.5 part by weight
deionized water 100 parts by weight
temperature 90° C.
time of contact of dye solution with article 1 hour

EXAMPLES 4–10 AND COMPARATIVE EXAMPLES E–I

A series of coating solution were prepared using the various sulfonic acid type monomers as are shown in Table 2 and hardened films were made by irradiating the respective solutions with ultraviolet rays in air using the method as in Example 1. The performance and properties of the coatings so produced were evaluated and the results are shown in Table 2.

As evidence from Table 2, the hardened, cross-linked coating films containing the sulfonic acid-type monomer of the present invention show uniformly high performance in respect of abrasion resistance, cloud prevention and dyeability while at the same time there is no substantial reduction in the antistaticity by washing and friction.

On the other hand, when vinylbenzene sulfonic acid, which is a sulfonic-type acid material other than that of the present invention, is used the solubility is so low that a large amount of N,N'-dimethylformamide has to be added. As a result, the coating material repels and is low in both surface smoothness and hardness. As a further point of comparison, we investigated various solutions containing a conventional hydrophilic monomer thought to be useful for improving cloud prevention, dyeability and antistaticity. One or more of these properties is reduced and there is no one result showing overall uniformly balanced properties as in the coatings produced in accordance with the present invention.

TABLE 2

| | Composition of Coating Solution (in parts by weight) | | | | | | | | | |
|---|---|---|---|---|---|---|---|---|---|---|
| | Monomer Mixture (A) | | | | | | Organic Solvent (B) | | | Photo-Sensitizer (C) |
| Experiment No. | 2P5A | 23G | THF-A | REA | MEP | Sulfonic acid monomer (2.0 pts) | N,N-di-methyl-form-amide | Iso-pro-panol | Tol-uene | BEE | Benzoil peroxide |
| Example 4 | 19.7 | 3.3 | 3.3 | 2.6 | 3.3 | Sulfoethyl methacrylate | 6.6 | 46.0 | 13.2 | 1.5 | 0.7 |
| Example 5 | " | " | " | " | " | Sulfopropyl acrylate | " | " | " | " | " |
| Example 6 | " | " | " | " | " | Sulfopropyl methacrylate | " | " | " | " | " |
| Example 7 | " | " | " | " | " | 2-acrylamide-2-methylpropane sulfonic acid | " | " | " | " | " |
| Example 8 | " | " | " | " | " | 2-methacrylamide-2-methyl propane sulfonic acid | " | " | " | " | " |
| Example 9 | " | " | " | " | " | Sodiumsulfopropyl methacrylate | 13.2 | 39.4 | " | " | " |
| Example 10 | " | " | " | " | " | 2-acrylamide-2-methyl propane sulfonic acid Na salt | 19.7 | 32.9 | " | " | " |
| E (Control) | " | " | " | " | " | Vinylbenzene sulfonic acid | 32.9 | 26.3 | 6.6 | " | " |
| F (Control) | " | " | " | " | " | Diacetone acrylamide | 6.6 | 46.0 | 13.2 | " | " |
| G (Control) | " | " | " | " | " | N,N-dimethyl-aminoethyl acrylate | " | " | " | " | " |
| H (Control) | " | " | " | " | " | 2-hydroxyethyl acrylate | " | " | " | " | " |
| I (Control) | " | " | " | " | " | Acrylic Acid | " | " | " | " | " |

TABLE 2-continued

| Experiment No | Hardened Film Thickness (μ) | Smoothness | Cloud prevention | Adhesion | Abrasion Resistance | | Half-Reduction Period (sec)*1 | | | Dyeability *2 |
|---|---|---|---|---|---|---|---|---|---|---|
| | | | | | Pencil Hardness | Steel Wool | A | B | C | |
| Example 4 | 3.1 | o | o | o | 7H | o | 0.5 | 0.6 | 0.6 | Dyed, deeply, uniformly |
| Example 5 | 3.2 | o | o | o | " | o | 0.7 | " | 0.8 | Dyed, deeply, uniformly |
| Example 6 | 3.0 | o | o | o | " | o | 0.4 | 0.5 | 0.9 | Dyed, deeply, uniformly |
| Example 7 | 3.1 | o | o | o | " | o | " | 0.4 | 0.4 | Dyed, deeply, uniformly |
| Example 8 | " | o | o | o | " | o | 0.6 | 0.9 | 0.7 | Dyed, deeply, uniformly |
| Example 9 | 3.0 | o | o | o | 6H | o | " | 1.0 | 0.9 | Dyed, deeply, uniformly |
| Example 10 | 3.2 | o | o | o | " | o | 0.5 | 0.6 | 0.5 | Dyed, deeply, uniformly |
| E (Control) | 3.0 | x | o | Δ | 2H | Δ | 1.1 | 180< | 180< | Dyed, deeply, but nonuniformly |
| F (Control) | 3.4 | Δ | o | x | B | x | 1.0 | " | " | Dyed, deeply, but nonuniformly |
| G (Control) | 2.8 | o | o | o | 3H | Δ | 0.8 | " | " | Dyed, deeply, uniformly |
| H (Control) | 2.9 | o | o | Δ | 4H | Δ | 1.1 | " | " | Dyed, deeply, uniformly |
| I (Control) | " | o | o | o | " | Δ | 1.3 | " | " | Dyed, deeply, uniformly |

*1 A = just after being hardened (untreated).
B = rubbed strongly with a sponge 30 times in water at 10° C., then water-washed, dried and measured.
C = rubbed strongly with a sponge 30 times in warm water at 50° C., then water-washed dried and measured.
*2 The dyeing method was the same as in Example 1.

EXAMPLES 11–14 AND COMPARATIVE EXAMPLES J AND K

The composition of Example 2 was repeated, this time using the kind of various alkylamines to form a series of hardened films and the performances were evaluated. The results are reported in Table 3.

EXAMPLES 15–17 AND COMPARATIVE EXAMPLES L–R

A series of coating solutions were prepared by varying the mixing ratio of 2-acrylamide-2-methylpropane sulfonic acid (AMPS) and N-lauryldiethanolamine (REA) as shown in Table 4, using the method of Example 4 to make a hardened film. The performances were evaluated and the results obtained are reported in Table 4.

TABLE 3

| Experiment No. | Alkylamine | Appearance of the Hardened Film | | Adhesion Resistance | |
|---|---|---|---|---|---|
| | | Smoothness | Transparency | Pencil Hardness | Steel Wool |
| Example 11 | Ethanolamine | o | Favorable | 7H | o |
| Example 12 | Diethanolamine | o | Favorable | 7H | o |
| Example 13 | N-cetyldiethanolamine | o | Favorable | 7H | o |
| Example 14 | Triethanolamine | o | Favorable | 7H | o |
| J (Control) | Triethylamine | Δ | Cloudy and nonuniform | 7H | o |
| K (Control) | Hexadecyldiethanolamine | o | Favorable | 2H | Δ |

| Experiment No. | Cloud Prevention | Cigarette Ash Test | Half-Reduction Period (sec)*1 | | | Dyeability*2 |
|---|---|---|---|---|---|---|
| | | | A | B | C | |
| Example 11 | o | o | 0.5 | 0.7 | 0.7 | Dyed, deeply, uniformly |
| Example 12 | o | o | 0.3 | 0.3 | 0.5 | Dyed, deeply, uniformly |
| Example 13 | o | o | 0.4 | 0.6 | 0.3 | Dyed, deeply, uniformly |
| Example 14 | o | o | 0.6 | 0.8 | 0.7 | Dyed, deeply, uniformly |
| J Control | Δ | o | 1.5 | 2.2 | 2.8 | Dyed nonuniformly |
| K Control | o | o | 0.3 | 0.3 | 0.4 | Dyed, deeply, uniformly |

*1The measuring method was the same as in Example 4.
*2The dyeing method was the same as in Example 1.

TABLE 4

| Experiment No. | Monomer Mixture (A) | | | | | | Organic Solvent (B) | | | Photosensitizer (C) |
|---|---|---|---|---|---|---|---|---|---|---|
| | 2P5A | 23G | THF-A | AMPS | REA | MEP | N,N-dimethyl formamide | Isopropanol | Toluene | BEE |
| Example 15 | 19.0 | 3.4 | 4.8 | 0.7 | 1.4 | 2.7 | 6.8 | 47.6 | 13.6 | 1.5 |
| Example 16 | 18.7 | 3.3 | 4.7 | 2.7 | 1.3 | 2.7 | 6.7 | 46.7 | 13.2 | 1.5 |
| Example 17 | 18.2 | 3.2 | 4.5 | 3.9 | 2.6 | 2.6 | 6.5 | 45.5 | 13.0 | 1.5 |
| L (Control) | 18.9 | 3.4 | 4.7 | 2.7 | 0 | 2.7 | 6.8 | 47.3 | 13.5 | 1.5 |
| M (Control) | 18.9 | 3.4 | 4.7 | 2.4 | 0.3 | 2.7 | 6.8 | 47.3 | 13.5 | 1.5 |
| N (Control) | 19.3 | 3.5 | 4.8 | 0.2 | 0.3 | 2.8 | 6.9 | 48.4 | 13.8 | 1.5 |
| O (Control) | 19.2 | 3.4 | 4.8 | 0 | 1.4 | 2.7 | 6.8 | 47.9 | 13.8 | 1.5 |
| P (Control) | 12.2 | 3.0 | 3.0 | 12.2 | 6.1 | 2.4 | 6.1 | 42.7 | 12.3 | 1.5 |
| Q (Control) | 15.2 | 3.0 | 3.0 | 6.1 | 9.1 | 2.4 | 6.1 | 42.7 | 12.3 | 1.5 |
| R (Control) | 19.4 | 3.5 | 4.9 | 0 | 0 | 2.8 | 6.9 | 48.6 | 13.9 | 1.5 |

| Experiment No. | Smoothness | Abrasion Resistance | | Cloud Prevention | Cigarette Ash Test | Half-Reduction Period (sec)*1 | | | Adhesion | Dyeability*2 | |
|---|---|---|---|---|---|---|---|---|---|---|---|
| | | Pencil Hardness | Steel Wool | | | A | B | C | | A | B |
| Example 15 | o | 7H | o | o | o | 1.0 | 0.9 | 1.1 | o | Dyed, deeply, uniformly | Dyed deeply, uniformly |
| Example 16 | o | 7H | o | o | o | 0.4 | 0.5 | 0.5 | o | Dyed, deeply, uniformly | Dyed deeply, uniformly |
| Example 17 | o | 7H | o | o | o | 0.3 | 0.3 | 0.3 | o | Dyed, deeply, uniformly | Dyed deeply, uniformly |
| L (Control) | x | 5H | Δ | x | Δ | 7.8 | 9.2 | 14.9 | o | Dyed, deeply but not uniformly | Dyed, deeply but not uniformly |
| M (Control) | Δ | 6H | o | Δ | o | 2.3 | 4.2 | 4.1 | o | Dyed, deeply but not uniformly | Dyed, deeply but not uniformly |
| N (Control) | o | 7H | o | o | o | 1.1 | 103.1 | 180< | o | Dyed, deeply uniformly | Dyed, deeply but not uniformly |
| O (Control) | o | 7H | o | o | o | 1.3 | 180< | 180< | o | Dyed, deeply uniformly | Dyed, deeply but not uniformly |
| P (Control) | x | 2B | x | x | o | 0.4 | 0.3 | 0.4 | x | Dyed, deeply but non-uniformly | Dyed deeply, but non-uniformly |
| Q (Control) | x | 2B | x | o | o | 0.3 | 0.5 | 0.3 | x | Dyed, deeply but non-uniformly | Dyed deeply, but non-uniformly |
| R (Control) | o | 7H | o | x | x | 180< | 180< | 180< | o | Not dyed at all | Not dyed at all |

*1 The measuring method was the same as in Example 4.
*2 Dyeing method A = the same as in Example 1. dyeing method B = dyed with Dianix Blue-BG-FS (dispersed dye produced by Mitsubishi Chemical Co.)/Disper-TC (dispersing agent produced by Meisei Chemical Co.)/methyl salicylate/ deionized water present in amounts of 5/3/1/100 (in parts by weight), repectively at 90° C. for 1 hour.

EXAMPLES 18–21 AND COMPARATIVE EXAMPLES S–W

A series of coating solutions were prepared by varying the type and amount of the phosphoric acid ester-type monomer as shown in Table 5 using the method of Example 4 to make a hardened film. Film performances were evaluated and the results obtained are given in Table 5.

As evidence from Table 5, even if a phosphoric acid ester-type monomer having no (meth)acryloxy groups is used, the desired effect of the present invention is not obtained and the expected cloud prevention property will not be improved. Also, even if the phosphoric acid ester-type monomer of the present invention is used, when the amount of this monomer added is small, the cloud prevention will be insufficient and, when it is too large, the hardness and adhesion will reduce such that no film balanced in the performances will be obtained.

TABLE 5

| Experiment No. | Composition of Coating Solution (in parts by weight) | | | | | | Organic Solvent (B) | | Photosensitizer (C) |
|---|---|---|---|---|---|---|---|---|---|
| | Monomer Mixture (A) | | | | | Phosphoric Acid Ester | Ethanol | Toluene | BEE |
| | 2P5A | 23G | THF-A | AMPS | RES | | | | |
| Example 18 | 24.5 | 4.1 | 4.1 | 3.3 | 3.3 | Acryloxyethyl phosphate 3.3 | 49.2 | 8.2 | 1.4 |
| Example 19 | 24.5 | 4.1 | 4.1 | 3.3 | 3.3 | Diacryloxyethyl phosphate 3.3 | 49.2 | 8.2 | 1.4 |
| Example 20 | 24.5 | 4.1 | 4.1 | 3.3 | 3.3 | Dimethacryloxyethyl phosphate 3.3 | 49.2 | 8.2 | 1.4 |
| Example 21 | 24.5 | 4.1 | 4.1 | 3.3 | 3.3 | Methacryloxyethyl phosphate 3.3 | 49.2 | 8.2 | 1.4 |
| S (Control) | 25.4 | 4.2 | 4.2 | 3.4 | 3.4 | Methacryloxyethyl phosphate 0 | 50.8 | 8.6 | 1.4 |
| T (Control) | 25.4 | 4.2 | 4.2 | 3.4 | 3.1 | Methacryloxyethyl phosphate 0.3 | 50.8 | 8.6 | 1.4 |
| U (Control) | 23.1 | 3.8 | 3.8 | 3.1 | 3.1 | Methacryloxyethyl phosphate 9.2 | 46.2 | 7.7 | 1.4 |
| V (Control) | 24.5 | 4.1 | 4.1 | 3.3 | 3.3 | Bis(2-chloroethyl)-vinyl phosphate 3.3 | 49.2 | 8.2 | 1.4 |
| W (Control) | 24.5 | 4.1 | 4.1 | 3.3 | 3.3 | 3-chloro-2-acid phosphoxypropyl methacrylate 3.3 | 49.2 | 8.2 | 1.4 |

| Experiment No. | Evaluation Results | | | | | | | | |
|---|---|---|---|---|---|---|---|---|---|
| | Smoothness | Steel Wool Hardness | Adhesion | Cloud Prevention | Cigarette Ash Test | Half-Reduced Period (Sec) | | | Dyeability*1 |
| | | | | | | A | B | C | |
| Example 18 | o | o | o | o | o | 0.8 | 0.4 | 0.4 | Dyed, deeply, uniformly |
| Example 19 | o | o | o | o | o | 0.7 | 0.6 | 0.6 | Dyed, deeply, uniformly |
| Example 20 | o | o | o | o | o | 0.9 | 0.8 | 0.9 | Dyed, deeply, uniformly |
| Example 21 | o | o | o | o | o | 0.4 | 0.5 | 0.5 | Dyed, deeply, uniformly |
| S (Control) | o | o | o | x | o | 0.5 | 0.5 | o.5 | Dyed, deeply, uniformly |
| T (Control) | o | o | o | Δ | o | 0.4 | 0.6 | 0.5 | Dyed, deeply, uniformly |
| U (Control) | o | Δ | Δ | o | o | 0.8 | 0.3 | 0.4 | Dyed, deeply, uniformly |
| V (Control) | Δ | o | o | x | o | 0.7 | 0.5 | 0.9 | Dyed, deeply, uniformly |
| W (Control) | Δ | o | Δ | x | Δ | 5.9 | 6.4 | 8.2 | Dyed, deeply but non-uniformly |

*1 The dyeing method was the same as in Example 1.

EXAMPLE 22

A hardened film was prepared using the coating solution of Example 2 on a polycarbonate resin plate (Upilon produced by Mitsubishi Gas Chemical Co.) having a thickness of 3 mm. using the same procedure as in Example 1 and its performances were investigated. The resulting cross-linked film was smooth, had a thickness of 3.2 microns and pencil hardness of 6H, was not scratched in the steel wool test and exhibited a high degree of adhesion. The half-reduction period was 0.4, 0.6 and 0.5 seconds, respectively, in methods A, B and C. The film could be dyed to be uniform in thickness. The cloud prevention was so favorable that the film was not clouded even in the breath test.

EXAMPLE 23

A hardened film was made by the same procedure as in Example 22 except this time using an eyeglass lens (CR-39 lens) having a diameter of 8 cm. and thickness of 2 mm. made of polyallylglycol carbonate and its performances were investigated. The film was smooth, was favorable in the appearance, was of a pencil hardness of 7H, was not scratched in the steel wool test and was high in adhesion. The half-reduction period was 0.6, 0.7 and 0.6 seconds, respectively, in methods A, B and C. The film could be dyed to be uniform in thickness and was high in cloud prevention.

EXAMPLE 24

A hardened film was made by repeating the method of Example 23 by using a lense (of a diameter of 8 cm. and thickness of 2 mm.) made of polymethyl methacrylate and its performances were evaluated. The obtained hardened film had substantially the same performances as were obtained in Example 23.

What is claimed is:

1. A coating composition comprising
   A. from about 5 to about 90 parts by weight of a monomer mixture which consists essentially of
      (1) from about 20 to about 95% by weight of a polyfunctional monomer having at least three (meth)acryloyloxy groups in one molecule;
      (2) from about 1 to about 25% by weight of a monomer represented by the formula:

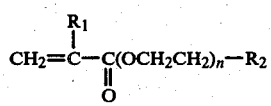

wherein $R_1$ is hydrogen or a methyl group, $R_2$ is an alkoxy or (meth)acryloyloxy group of 1 to 5 carbon atoms and n is an integer of 5 to 30;
      (3) from about 1 to about 15% by weight of a sulfonic acid type monomer represented by the formula:

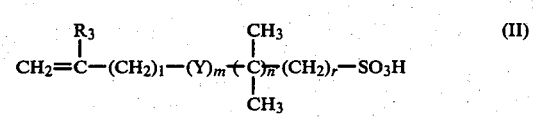

wherein $R_3$ is hydrogen or a methyl group, Y is a —CONH or —COO group and 1, m, n' and r are integers of 0 to 5);
      (4) from about 1 to about 20% by weight of a phosphoric acid ester-type monomer represented by the formula:

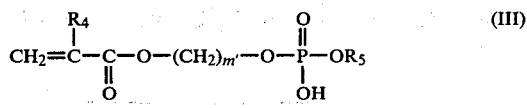

wherein $R_4$ is hydrogen or a methyl group, $R_5$ is hydrogen or a

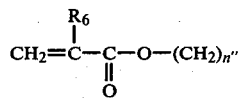

group, $R_6$ is hydrogen or a methyl group and m' and n'' are integers of 1 to 15; and
      (5) from about 2 to about 20% by weight of an ethanolamine-type compound represented by the formula:

$$NR_7R_8(CH_2CH_2OH) \qquad (IV)$$

wherein each of $R_7$ and $R_8$ is independently hydrogen or an alkyl group of 1 to 15 carbon atoms or a $CH_2CH_2OH$ group; together with
   B. from about 95 to about 10 parts by weight of at least one organic solvent that forms a uniform solution when mixed with said monomer mixture A; and
   C. up to 10 parts by weight of a photosensitizing agent per 100 parts by weight of the total of the monomer mixture A and organic solvent B;

said coating composition capable of forming a dyeable, cross-linked hardened film high in abrasion resistance, surface smoothness and cloud prevention, said film having a permanent antistaticity when irradiated with active energy rays.

2. The coating composition according to claim 1 wherein said polyfunctional monomer (1) is a polypentaerythritol poly(meth)acrylate having at least three (meth)acryloyloxy groups per molecule and represented by the formula:

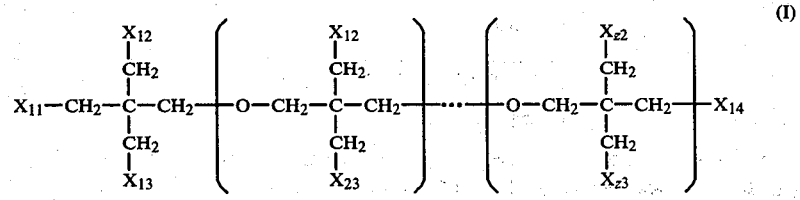

wherein at least 3 of $X_{11}$, $X_{12}$, $X_{13}$, $X_{22}$, $X_{23}$, —$X_{z2}$, $X_{z3}$ and $X_{14}$ are (meth)acryloyloxy groups and the rest are OH groups and z is an integer of 1 to 5.

3. The coating composition according to claims 1 or 3 wherein polyfunctional monomer (1) is present in an amount of from about 40 to about 90% by weight of monomer mixture A.

4. The coating composition according to claim 1 wherein low viscosity monomers having a boiling point of not less than about 150° C. under atmospheric pressure and a viscosity not greater than 20 centipoises is used together with the polyfunctional monomer (1).

5. The coating composition according to claims 1 or 2 wherein said sulfonic acid-type monomer (3) is present in an amount of from about 5 to about 10% by weight of monomer mixture A.

6. The coating composition according to claims 1 or 2 wherein said phosphoric acid ester-type monomer is selected from the group consisting of (meth)acryloxyethyl phosphate, di(meth)acryloxyethyl phosphate, (meth)acryloxypropyl phosphate, (meth)acryloxybutyl phosphate and mixtures thereof.

7. The coating composition according to claims 1 or 2 wherein said ethanolamine-type compound (5) is present in an amount of from about 5 to about 15% of monomer mixture A.

8. The coating composition according to claims 1, 2 or 7 wherein said ethanolamine-type compound (5) is selected from the group consisting of ethanolamine, beta-ethylhexylethanolamine, diethanolamine, N-butyldiethanolamine, N-hexyldiethanolamine, N-lauryldiethanolamine, N-cetyldiethanolamine, triethanolamine and mixtures thereof.

9. The coating composition according to claim 1 wherein the weight ratio of component (3) to component (5) is within the range of 0.3:1 to 3:1.

10. The coating composition according to claims 1 or 2 wherein said organic solvent has a boiling point in the range of about 50 to about 200° C. at atmospheric pressure and a viscosity at room temperature not greater than 10 centipoises.

11. The coating composition according to claim 1 wherein the amount of said photosensitizing agent C is about 0.01 to about 10 parts by weight of the total of components A and B.

12. A coating composition comprising
   A. from about 5 to about 90 parts by weight of a monomer mixture which consists essentially of
   2 (1) from about 20 to about 95% by weight of a polypentaerythritol poly(meth)acrylate having at least three (meth)acryloyloxy groups per molecule and represented by the formula:

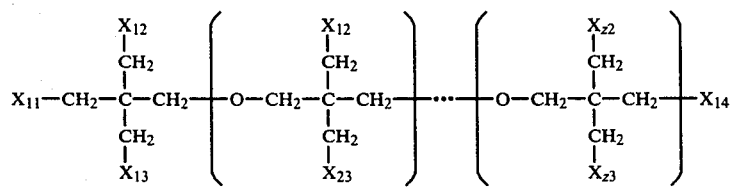

wherein at least 3 of $X_{11}$, $X_{12}$, $X_{13}$, $X_{22}$, $X_{23}$, $X_{z2}$, $X_{z3}$ and $X_{14}$ are (meth)acryloyloxy groups, and the rest are OH groups and z is an integer of 1 to 5;

(2) from about 1 to about 25% by weight of a monomer represented by the formula:

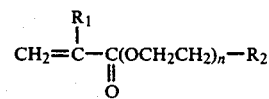

wherein $R_1$ is hydrogen or a methyl group, $R_2$ is an alkoxy or (meth)acryloyloxy group of 1 to 5 carbon atoms and n is an integer of 5 to 30;

(3) from about 1 to about 15% by weight of a sulfonic acid-type monomer represented by the formula:

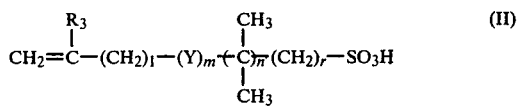

wherein $R_3$ is hydrogen or a methyl group, Y is a —CONH or —COO group and 1, m, n′ and r are integers of 0 to 5;

(4) from about 1 to about 20% by weight of a phosphoric acid ester-type monomer represented by the formula:

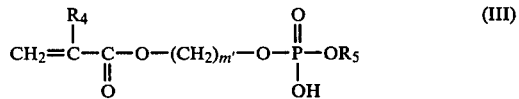

wherein $R_4$ is hydrogen or a methyl group, $R_5$ is hydrogen or a

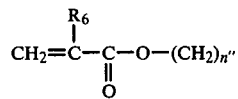

group, $R_6$ is hydrogen or a methyl group and m′ and n″ are integers of 1 to 15; and (5) from about 2 to about 20% by weight of an ethanolamine-type compound represented by the formula:

$$NR_7R_8(CH_2CH_2OH) \qquad (V)$$

wherein each of $R_7$ and $R_8$ is independently hydrogen or an alkyl group of 1 to 15 carbon atoms or a $CH_2CH_2OH$ group; together with B. from about 95 to about 10 parts by weight of at least one organic solvent that forms a uniform solution when mixed with said monomer mixture A; and C. 0.01 to 10 parts by weight of a photosensitizing agent per 100 parts by weight of the total of the monomer mixture A and organic solvent B;

said coating composition capable of forming a dyeable, cross-linked hardened film high in abrasion resistance, surface smoothness and cloud prevention, said film having a permanent antistaticity when irradiated with active energy rays.

* * * * *